United States Patent
Gerdisch et al.

(10) Patent No.: US 11,123,899 B2
(45) Date of Patent: Sep. 21, 2021

(54) METHOD FOR SEAMING MULTI-SECTIONAL COMPOSITE TOOLING

(71) Applicant: Hexcel Corporation, Dublin, CA (US)

(72) Inventors: Mark Gerdisch, San Clemente, CA (US); Richard Callis, Covington, WA (US); Adam Senta, Seattle, WA (US)

(73) Assignee: HEXCEL CORPORATION, Dublin, CA (US)

(*) Notice: Subject to any disclaimer, the term of this patent is extended or adjusted under 35 U.S.C. 154(b) by 413 days.

(21) Appl. No.: 16/386,538

(22) Filed: Apr. 17, 2019

(65) Prior Publication Data
US 2019/0248046 A1 Aug. 15, 2019

Related U.S. Application Data

(62) Division of application No. 14/820,714, filed on Aug. 7, 2015, now abandoned.

(51) Int. Cl.
| | |
|---|---|
| *B29C 33/38* | (2006.01) |
| *B29C 70/30* | (2006.01) |
| *B29C 33/30* | (2006.01) |
| *B29C 33/40* | (2006.01) |
| *B29K 79/00* | (2006.01) |
| *B29K 105/08* | (2006.01) |

(Continued)

(52) U.S. Cl.
CPC ........ *B29C 33/3807* (2013.01); *B29C 33/301* (2013.01); *B29C 33/3842* (2013.01);
(Continued)

(58) Field of Classification Search
CPC ... B29C 33/3807; B29C 33/301; B29C 33/40; B29C 33/3842; B29C 70/30;
(Continued)

(56) References Cited

U.S. PATENT DOCUMENTS

| | | | |
|---|---|---|---|
| 6,689,448 B2 * | 2/2004 | George | ................ B29C 70/342 428/105 |
| 8,540,833 B2 | 9/2013 | Deobald et al. | |

(Continued)

FOREIGN PATENT DOCUMENTS

| | | |
|---|---|---|
| EP | 2907652 A2 | 8/2015 |
| JP | H04-179513 A | 6/1992 |

(Continued)

OTHER PUBLICATIONS

NPL-1. Koziol, Mateusz. "The effect of reinforcing fabric type on mechanical performance of laminar FR epoxy composite." Composites Theory and Practice 1 (2012): 60-65.

(Continued)

*Primary Examiner* — Leith S Shafi
(74) *Attorney, Agent, or Firm* — W. Mark Bielawski (57) ABSTRACT

Method for seaming a multi-sectional composite tooling for use in molding large composite structures. The tooling includes at least two tooling sections that are made from quasi-isotropic sheet molding compound. The two tooling sections are seamed together with a scarf plug at the tooling surface. The scarf plug is composed of specially oriented layers of consolidated quasi-isotropic sheet molding compound. The scarf plug is made from the same type of quasi-isotropic sheet molding compound that is used to make the tooling sections.

10 Claims, 4 Drawing Sheets

(51) Int. Cl.
*B29K 307/04* (2006.01)
*B29L 31/00* (2006.01)

(52) U.S. Cl.
CPC .............. *B29C 33/40* (2013.01); *B29C 70/30* (2013.01); *B29K 2079/08* (2013.01); *B29K 2105/0881* (2013.01); *B29K 2307/04* (2013.01); *B29L 2031/757* (2013.01)

(58) Field of Classification Search
CPC ........ B29K 2079/08; B29K 2105/0881; B29K 2307/04; B29L 2031/757
See application file for complete search history.

(56) References Cited

U.S. PATENT DOCUMENTS

| | | | |
|---|---|---|---|
| 9,079,365 B2 | 7/2015 | Wiles et al. | |
| 2002/0031641 A1* | 3/2002 | George | B29C 70/545 |
| | | | 428/105 |
| 2014/0338815 A1 | 11/2014 | Davis et al. | |
| 2015/0231848 A1 | 8/2015 | Chapman et al. | |

FOREIGN PATENT DOCUMENTS

| | | |
|---|---|---|
| JP | 2012-011695 A | 1/2012 |
| JP | 2012-135967 A | 7/2012 |
| JP | 2013-035148 A | 2/2013 |
| JP | 2015-093385 A | 5/2015 |
| WO | 2013/097859 A2 | 7/2013 |
| WO | 2016/011655 A1 | 1/2016 |

OTHER PUBLICATIONS

HexTOOL(R) User Guide, pp. 1-44, Aug. 2013.

* cited by examiner

METHOD FOR SEAMING MULTI-SECTIONAL COMPOSITE TOOLING

This application is a divisional of U.S. Ser. No. 14/820,714, filed on Aug. 7, 2015.

BACKGROUND OF THE INVENTION

1. Field of the Invention

The present invention relates generally to apparatus and methods used to mold composite materials into large composite structures. More particularly, the present invention is directed to the multi-sectional tools that are used to form such large composite structures and the ways in which the sections of such tools are joined together.

2. Description of Related Art

Many processes for making composite structures utilize a mold to provide desired surface contours and shapes. The mold is particularly important in autoclave processes where the uncured resin/fiber material is heated in the mold, under vacuum, to relatively high cure temperatures (175° C. and above) to form the final composite part or structure.

Molds made from steel alloys, such as INVAR36, are commonly used because they are extremely strong and can easily withstand the elevated cure temperatures used in autoclaves for composite material curing. These molds are also commonly referred to as "tools" or "tooling". Steel alloy tooling can be machined to obtain tight surface profile tolerances. In addition, tooling for molding large structures can be made by joining sections of steel alloy tooling together and welding the seams. The welded seams can be machined and polished to eliminate any imperfections in the mold surface to produce a seamless tooling surface that is free from unwanted "mark off" on the parts cured surface. Although steel alloys are well suited for making multi-sectional large tooling, there are a number of drawbacks. For example, steel alloy tooling tends to be heavy and expensive. In addition, the time required to heat and then cool a massive multi-sectional steel alloy tooling increases the cycle time during molding of composite structures.

Tooling made from composite materials have been developed as an alternative to steel alloy tooling for use in autoclave molding of composite parts. Composite tooling has been popular because it is typically lighter than steel alloy tooling. The composite tooling is generally formed using a highly accurate master mold that is made from a steel alloy or other suitable material.

Pre-impregnated composite material (prepreg) is typically used to make composite tooling. Prepreg is a combination of uncured resin matrix and fiber reinforcement that is ready for molding and curing to form the composite tool. By pre-impregnating the fiber reinforcement with resin, the manufacturer can carefully control the amount and location of resin that is impregnated into the fiber network and ensure that the resin is distributed in the network as desired.

Unidirectional (UD) tape is a common form of prepreg. The fibers in unidirectional tape are continuous fibers that extend parallel to each other. The fibers are typically in the form of bundles of numerous individual fibers or filaments that are referred to as "tows". The unidirectional fibers are impregnated with a carefully controlled amount of uncured resin. The UD prepreg is typically placed between protective layers to form a UD tape that is rolled up for storage or transport to the manufacturing facility. The width of UD tape typically ranges from less 2 cm to 30 cm or more.

Unidirectional tape is not well-suited for use in making composite tooling. The parallel orientation and continuous nature of the fibers in the UD tape cause fiber bunching or bridging when the UD tape is forced to fit the features of a complex tool shape. In addition, composite tooling made from UD tape cannot be machined to obtain the tight surface profile tolerances that are required for composite tooling without significant tool movement.

Molding compounds, which are generically referred to as discontinuous fiber composite (DFC) molding compound, have been found to be suitable for use in making composite tooling. One type of DFC molding compound, which is referred to herein as quasi-isotropic sheet molding compound, combines the attributes of UD tape and randomly oriented short fibers into a single molding compound that can be accurately molded and machined to form composite tooling. Quasi-isotropic sheet molding compound is composed of randomly oriented segments or chips of unidirectional tape that have been impregnated with thermosetting resin. Quasi-isotropic sheet molding compound has been widely used to make composite tooling. Quasi-isotropic sheet molding compound is available from Hexcel Corporation (Dublin, Calif.) under the trade names HexTool® and HexMC®. Examples of composite molds or tooling that have been made using HexTool® or HexMC® are described in U.S. Pat. No. 8,257,631, the contents of which are hereby incorporated by reference.

Quasi-isotropic sheet molding compound is typically made by laying multifilamentary tows (yarns) parallel to each other on a suitable backing and impregnating the parallel tows with resin to form a UD prepreg. The UD prepreg is then chopped to form UD chips which are generally from 5 mm to 25 mm wide and from 25 mm to 125 mm long. A layer of quasi-isotropically oriented UD chips is then formed. Multiple layers of the quasi-isotropically oriented UD chips are combined together to form a ply-like molding material which is used to make composite tooling.

The light weight and high strength of composite tooling makes it particularly attractive for use in making large composite structures or parts, such as aircraft wings, aircraft fuselages, horizontal stabilizer spar tools, wing spar tools and empennage tools. Molding of such large composite structures requires composite tooling having surfaces that are typically over 3 meters long and over 1 meter wide. The location where the composite tooling is made is usually not the same as the location where the tooling is used to mold the large composite structures. It is not practical to make a single large composite tooling at one location and then transport it to another location for use in molding large composite structures. Instead, multiple tooling sections are made that can be transported by truck or other suitable transport to the manufacturing site where the large composite structures are molded. Once at the manufacturing site, the multiple tool sections are joined together to form the desired single large composite tooling.

An important consideration when joining multiple composite tooling sections together is ensuring that the seams between the tooling sections are filled or otherwise treated to eliminate any surface imperfections in the overall tooling surface. The material used to fill the seam must be durable enough to withstand numerous molding cycles. The material used to fill the seam should also have physical properties, such as a coefficient of thermal expansion, that match the physical properties of the material used to make the tooling sections in order to prevent separation at the bond lines between the seam and the tooling sections. The seam filling material must be amenable to machining in the same manner as the surfaces of the composite tooling sections in order to provide a tooling surface that is free of imperfections at the seams. In addition, the seam filling cannot be porous or have other imperfections which would be exposed during initial or subsequent machining and/or polishing of the tooling surface.

SUMMARY OF THE INVENTION

In accordance with the present invention, a multi-sectional tooling is provided in which the seams between the tooling section surfaces are filled with a scarf plug that is made from the same type of quasi-isotropic sheet molding compound that is used to make the tooling sections. The scarf plug is specifically designed and oriented to eliminate any surface imperfections in the overall tooling surface. The scarf plug has the same durability as the tooling sections so that it can withstand numerous molding cycles. In addition, the scarf plug can be machined in the same manner as the surfaces of the composite tooling sections to provide a seamless multi-sectional tooling surface.

The multi-sectional tooling of the present invention is designed for use in molding large composite structures that have a molded surface. The multi-sectional tooling includes a first tooling section having a first tooling surface which is shaped to form a first portion of the molded surface of the large composite structure. The first tooling section includes a first side surface and a first scarf surface that extends at an angle from the first tooling surface to the first side surface. The first scarf surface has a first exterior edge located at the first tool surface and a first interior edge located at the first side surface. The first tooling section is made from multiple layers of cured quasi-isotropic sheet molding compound.

The multi-sectional tooling also includes a second tooling section having a second tooling surface which is shaped to form a second portion of the molded surface of the large composite structure. The second tooling section includes a second side surface and a second scarf surface that extends at an angle from the second tooling surface to the second side surface. The second scarf surface has a second exterior edge located at the second tooling surface and a second interior edge located at said second side surface. The second tooling section is also made from multiple layers of cured quasi-isotropic sheet molding compound.

The first tooling section and second tooling section are located adjacent to each other so that the first scarf surface and said second scarf surface form a scarf seam. The scarf seam has an apex extending along the first and second interior edges of the scarf surfaces. The scarf seam also has an exterior boundary extending between the first and second exterior edges of the scarf surfaces. The exterior boundary of the scarf seam is coincident with the tooling seam surface that extends between the first tooling surface and second tooling surface.

As a feature of the present invention, a scarf plug is provided that fills the scarf seam. The scarf plug includes a first scarf plug layer which is a layer of cured quasi-isotropic sheet molding compound that has an interior side and an exterior side. The interior side of the first scarf plug layer is located adjacent to the first and second scarf surfaces and extends from the first exterior edge located on first scarf surface to the seam apex and from the seam apex to the second exterior edge located on the second scarf surface. The exterior side of the first scarf plug layer has a surface contour in the shape of a chevron extending from the first exterior edge to the second exterior edge of the scarf seam. The scarf plug also includes a plurality of additional scarf plug layers that are located between the exterior side of the first scarf plug layer and the exterior boundary of the scarf seam. Each of the additional scarf plug layers is composed of a layer of cured quasi-isotropic sheet molding compound. Each of the additional scarf plug layers has an interior side and an exterior side. The additional scarf plug layers are located in the scarf plug such that the interior side of each additional scarf plug layer is located next to the exterior side of an adjacent additional scarf plug layer that is closer to the first scarf plug layer. The interior side of one of the additional scarf plug layers is located next to the exterior side of the first scarf plug layer and follows the surface contour of the first scarf plug layer. The additional scarf plug layers form the tooling seam surface.

As a feature of the invention, a consolidated scarf plug is prepared which has the shape of the desired scarf plug, but which includes uncured quasi-isotropic sheet molding compound. The consolidated scarf plugs are oversized so that a portion of the consolidated scarf plug extends above the tooling seam surface when the consolidated scarf plug is inserted into the scarf seam. After curing, the portion of the scarf plug that remains above the tooling seam surface is machined off in order to provide a final scarf plug which has an exterior boundary that is coincident with the tooling seam surface.

In addition to covering multi-sectional tooling and the consolidated scarf plugs that are used to fill the seams in the tooling surface, the present invention also covers methods for filling the seams of multi-sectional tooling using the consolidated scarf plugs.

The scarf plugs in accordance with the present invention are particularly well suited for filling the surface seams between composite tooling sections made from quasi-isotropic sheet molding compound. The scarf plugs are durable enough to withstand numerous molding cycles in the same manner as the tooling sections. The scarf plugs have physical properties, such as a coefficient of thermal expansion, that match the physical properties of the material used to make the tooling section in order to prevent separation at the bond lines between the seam tooling sections. The scarf plugs can be machined and/or polished in the same manner as the surfaces of the composite tooling sections in order to provide a tooling surface that is free of imperfections at the seams.

The process of consolidating multiple layers of quasi-isotropic sheet molding compound to form a consolidated scarf plug, which is then autoclave cured in the seam between the tooling sections, produces a multi-sectional tooling surface that is essentially seamless. The scarf plug seams made in this manner are not porous and they do not have other imperfections that could be exposed during initial or subsequent machining and/or polishing of the scarf plug and surrounding tooling surfaces.

The above discussed and many other features and attendant advantages of the present invention will become better understood by reference to the detailed description when taken in conjunction with the accompanying drawings.

DETAILED DESCRIPTION OF THE INVENTION

Figure 1:
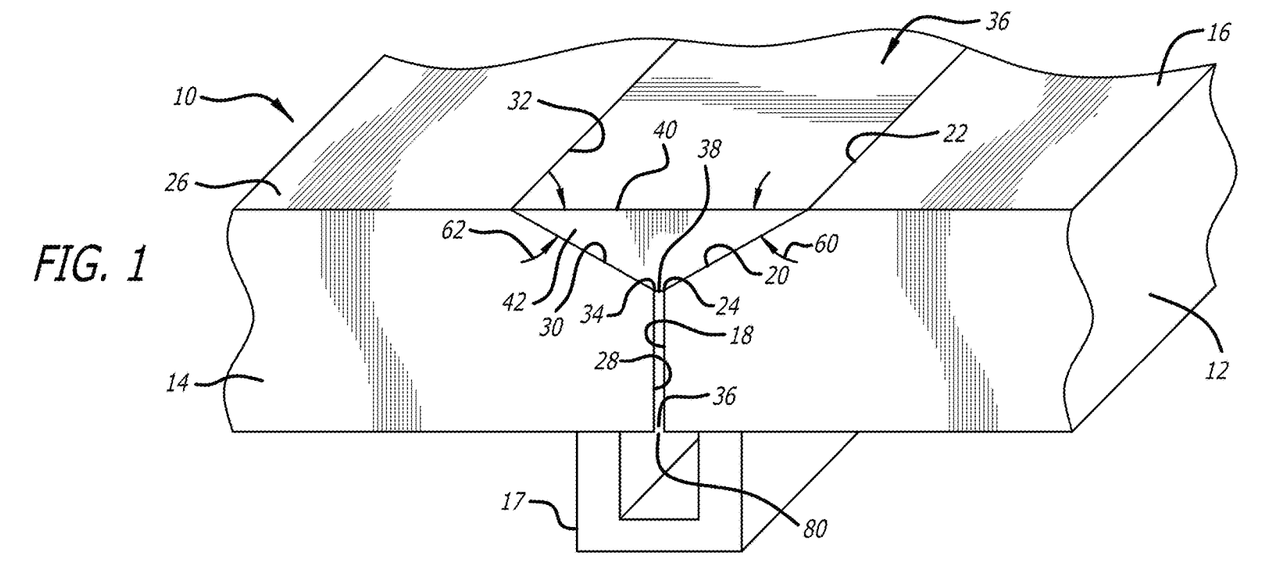
FIG. 1 is a partial view of an exemplary multi-sectional composite tooling in accordance with the present invention showing the seam between two tooling sections.
Figure 2:
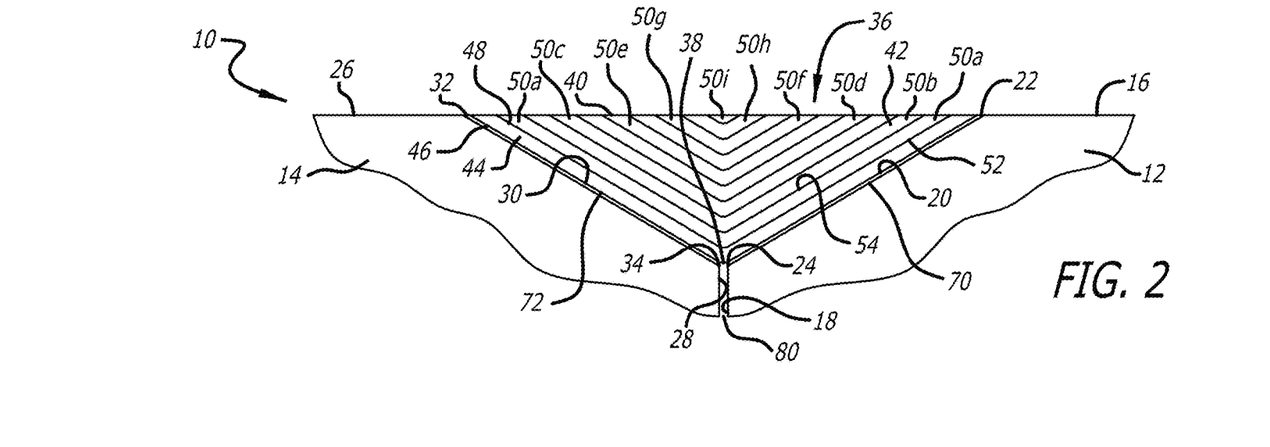
FIG. 2 is a side view of FIG. 1 showing details of the scarf plug laminate structure.

A portion of an exemplary multi-sectional composite tooling in accordance with the present invention is shown at 10 in FIGS. 1 and 2. The multi-sectional tooling is intended for use in fabricating large composite parts or structures in accordance with known autoclave curing processes where service temperatures are typically between 170° C. and 260° C. and where the tooling surfaces are exposed to pressures of between 45 psi and 125 psi. However, if desired, the tooling may be used in other molding processes where it is not necessary to heat the material being molded to such high temperatures and/or where high pressure is not used in the molding process.

Exemplary large composite parts or structures that can be molded using the multi-sectional tooling includes aircraft wings, fuselages, horizontal stabilizer spar tools, wing spar tools and empennage tools. The overall size of the molding surface provided by the multi-sectional tooling can range from a few square meters to over 100 square meters. The size of the molding surface is only limited by the number of tooling sections that are joined together and the ability to properly support the tooling. Each section of the tooling is preferably sized so that it can be transported by road, railway and/or air transport. Preferably, the individual tooling sections will not exceed 3 meters in width and 12 meters in length.

Although the multi-sectional tooling may include any number of tooling sections, which depends upon the size of the desired over all tooling and the size of the individual sections, for exemplary purposes the multi-sectional tooling 10 is shown having only a first tooling section 12 and a second tooling section 14. The tooling sections 12 and 14 are securely joined together by a structural joint element 17. The joint element 17 is sufficiently strong to keep the tooling sections precisely positioned during numerous autoclave molding cycles. The overall multi-sectional tooling 10 is also supported by other support structures (not shown) in accordance with known molding processes that utilize composite tooling.

The first tooling section 12 has a first tool surface 16 which is shaped to form a first portion of the molded surface of a large composite structure. The first tooling section 12 also includes a first side surface 18 and a first scarf surface 20 that extends at an angle from the first tool surface 16 down to the first side surface 18. The first scarf surface 20 has a first exterior edge 22 located at the first tool surface 16 and a first interior edge 24 located at the first side surface 18. The first tool section 12 is made from multiple layers of cured quasi-isotropic sheet molding compound, such as HexTool® or HexMC®, which is composed of a plurality of randomly oriented chips where each chip contains unidirectionally oriented fibers and a cured resin.

The second tooling section 14 has a second tool surface 26 which is shaped to form a second portion of the molded surface of a large composite structure. The second tooling section 14 also includes a second side surface 28 and a second scarf surface 30 that extends at an angle from the second tool surface 26 down to the second side surface 28. The second scarf surface 30 has a second exterior edge 32 located at the second tool surface 26 and a second interior edge 34 located at the second side surface 28. The second tool section 14 is made from multiple layers of cured quasi-isotropic sheet molding compound, such as HexTool® or HexMC®, which is composed of a plurality of randomly oriented chips where each chip contains unidirectionally oriented fibers and a cured resin.

The first tooling section 12 and second tooling section 14 are located adjacent to each other so that the first scarf surface 20 and second scarf surface 30 form a scarf seam 36 located at the surface between the two tooling section. The scarf seam 36 has an apex 38 that extends along the first interior edge 24 and second interior edge 34. The scarf seam 36 also has an exterior boundary 40 that extends between the first and second exterior edges 22 and 32 of the tooling sections. The exterior boundary 40 is coincident with the tooling seam surface that extends between the first and second surfaces 16 and 26 of the tooling sections.

In accordance with the present invention, a scarf plug 42 fills the scarf seam 36. The scarf plug 42 includes a first scarf plug layer 44 that is composed of a layer of cured quasi-isotropic sheet molding compound, such as HexTool® or HexMC®, which is made up of a plurality of randomly oriented chips where each chip contains unidirectionally oriented fibers and a cured resin. The first scarf plug layer 44 includes an interior side 46 and an exterior side 48. The interior side 46 of the scarf plug is located adjacent to the first and second scarf surfaces 20 and 30. The interior side 46 of the scarf plug layer extends from the first exterior edge 22 of the first tooling to the apex 38 and from the apex 38 to the second exterior edge 32 of the second tooling. The exterior side 48 of the first scarf plug layer has a surface contour in the shape of a chevron that extends from the first exterior edge 22 to the second exterior edge 32.

The scarf plug 42 includes a plurality of additional scarf plug layers 50a-50i that are located between the exterior side 48 of the first scarf plug layer and the exterior boundary 40 of the scarf seam. Each of the additional scarf layers 50a-50i is made from a layer of cured quasi-isotropic sheet molding compound, such as HexTool® or HexMC®, which is composed of a plurality of randomly oriented chips where each chip contains unidirectionally oriented fibers and a cured resin.

Each of the additional scarf plug layers 50a-50i has an interior side and an exterior side. For example the interior side of additional scarf plug layer 50a is shown at 52 and the exterior side is shown at 54. The additional scarf plug layers 50a-50i are located in the scarf plug 42 such that the interior side of each additional scarf plug layer is located next to the exterior side of an adjacent additional scarf plug layer that is closer to the first scarf plug layer 44. The interior side of additional scarf plug layer 50a is located next to the exterior side 48 of the first scarf plug layer and follows the surface contour 48 of the first scarf plug layer. The additional scarf plug layers 50a-50i terminate at and/or form the seam boundary 40 that is coincident with the tooling seam surface.

The angle 60 between the first scarf surface 20 and the seam boundary 40 (also referred to as the chamfer) should be between 20 and 45 degrees. The chamfer or angle 62 between the second scarf surface 30 and the seam boundary 40 should also be between 20 and 45 degrees. It was discovered that the angle of the chevron shape for the scarf plug was important in providing an adequate seam having low levels of porosity. Scarf plugs filling seams with chamfers of over 45 degrees are not suitable. Chamfers of between 45 and 35 degrees provide seams that are acceptable for many molding applications. However, for tooling that will be used in autoclaves at high temperatures and high pressures, it is preferred that the chamfer be between 25 and 35 degrees. Seams with chamfers of 30 degrees were found to provide particularly effective seams that are not porous and which are particularly suitable for use in tooling that is exposed to the high pressures and temperatures that occur during autoclave molding of composite parts.

Figure 6:
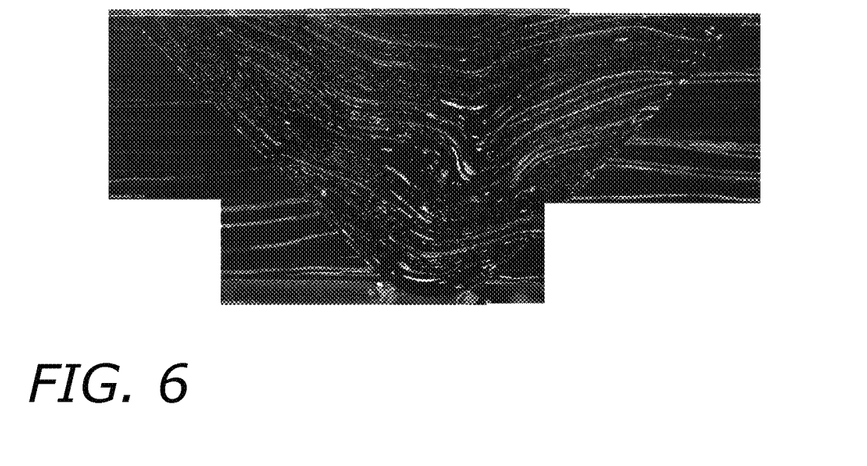
FIG. 6 is a cross-sectional photograph of a scarf plug seam having a 45 degree chevron cross-sectional shape.

A side sectional view of a chevron-shaped scarf plug is shown in FIG. 6 where the scarf plug is in place within a seam that is bordered on each side by a composite tooling made with multiple layers of 4000 grams per square meter (gsm) M61 HexTool® sheet molding compound. The scarf plug was made from 10 layers of 4000 grams per square meter (gsm) M61 HexTool® sheet molding compound. The chamfer for the first and second tooling sections in FIG. 6 is 45 degrees. The top of the scarf plug, which forms the exterior boundary 40, is 5 cm wide.

Figure 7:
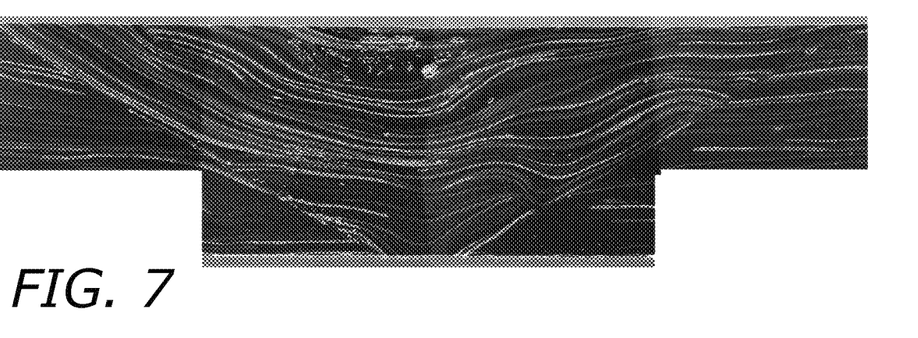
FIG. 7 is a cross-sectional photograph of a preferred scarf plug seam having a 30 degree chevron cross-sectional shape.

A side sectional view of chevron-shaped scarf plug in place in a seam that is bordered on each side by composite tooling made with multiple layers of 4000 grams per square meter (gsm) M61 HexTool® sheet molding compound is also shown in FIG. 7. The scarf plug was made from 10 layers of 4000 grams per square meter (gsm) M61 HexTool® sheet molding compound. In FIG. 7, the chamfer for the first and second tooling sections is 30 degrees. The top of the scarf plug is also 5 cm wide. The top of the scarf plugs are typically from 2 to 10 cm wide.

The scarf plugs and tooling sections shown in FIGS. 6 and 7 were both prepared in the same manner following standard procedures for molding M61 HexTool® sheet molding compound. It was discovered that the 30 degree scarf plug shown in FIG. 7 had interlaminar porosity and bondline porosity that was substantially less than the 45 degree scarf plug shown in FIG. 6. Accordingly, the scarf plug design shown is FIG. 7 is preferred for seaming multi-sectional tooling that will be used in autoclaves that operate at temperatures above 150° C. and pressures of 45 psi to 125 psi.

It is preferred that a layer of scarf plug adhesive be located between the scarf plug 42 and the first and second scarf surfaces 20 and 30, as shown at 70 and 72, respectively. The material used as the scarf plug adhesive can be any suitable adhesive that is compatible with the resin used in the scarf plug and tooling sections. For high temperature molding (150° C. and above), adhesives made from bismaleimide, polyimide, polyether ether ketone, phenolic and the like are preferred. HP655 bismaleimide film adhesive, which is available from Hexcel Corporation (Salt Lake City, Utah), is a preferred scarf plug adhesive. The adhesive layer is preferably as thin as possible while still providing desired levels of bonding. Preferred thicknesses for the adhesive layer range from 20 microns to 1.5 mm thick.

The space or gap between side surfaces 18 and 28 is sealed with a layer of sealant or adhesive 80. The material used as the sealant can be any suitable sealant or adhesive that is compatible with the resin used in the tooling sections. For high temperature molding (150° C. and above), sealants made from bismaleimide, polyimide, polyether ether ketone, phenolic and the like are preferred. HP655 bismaleimide film adhesive is a preferred sealant. The gap 36 is preferably from 1 mm to 4 mm wide.

The scarf seam 36 is initially over filled with a consolidated scarf plug that is composed of uncured layers of quasi-isotropic sheet molding compound that have been consolidated under pressure and elevated temperature to form a chevron-shaped plug that closely matches the shape of the scarf seam 36. The consolidated scarf plug is slightly larger than the scarf seam so that when the consolidated scarf plug is cured, it forms an over-sized scarf plug as shown at 90 in FIG. 3.

Figure 3:
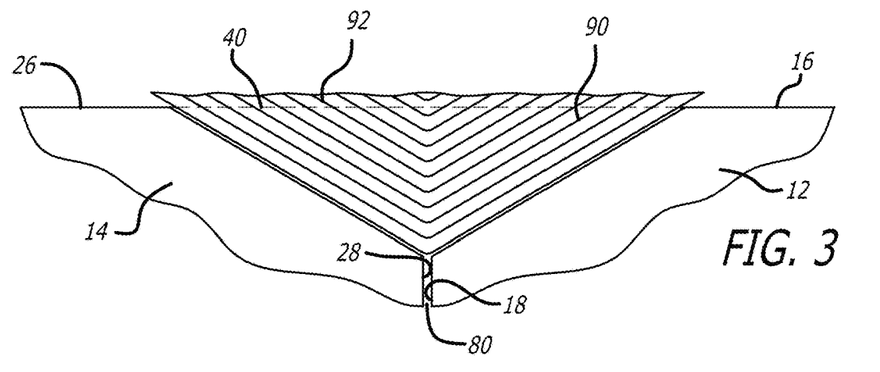
FIG. 3 is a side view showing an oversized scarf plug prior to machining to form the final scarf plug seam as shown in FIGS. 1 and 2.

It should be noted that the gap between side surfaces 18 and 28 is sealed with sealant layer 80 prior to the consolidated scarf plug being placed into the scarf seam 36. The pre-positioning of the sealant layer 80 is required in order to provide a seal between the tooling sections 12 and 14 so that pressure can be applied during molding of the consolidated scarf plug to form the cured over-sized scarf plug 90.

The portion 92 of the over-sized cured scarf plug 90, which is located above the exterior boundary of the seam (shown in phantom at 40 in FIG. 3), is removed to provide a scarf plug having a scarf surface that coincides with the exterior seam boundary 40. The excess portion of the over-sized scarf plug is removed using any of the known machining tools and techniques that are commonly used in machining steel and/or composite material molds. Such machining tools typically employ carbide and diamond coated numerical controlled (N/C) cutters. The scarf plug surface and surrounding tooling surfaces are machined and polished, if necessary, to achieve desired surface tolerances. Typical surface tolerances are on the order of ±0.2 mm or less. The tooling surface and seam surface tolerances can be on the order of ±0.1 mm and even as accurate as ±100 microns.

Since the scarf plug 42 and surrounding tooling surfaces are made from the same type of quasi-isotropic sheet molding compound, the machining and polishing of these surfaces produces a multi-sectional tooling surface that is virtually seamless. Another advantage is that the scarf plug surface has the same durability as the tooling surface when the tooling is used repeatedly to autoclave mold composite parts at high temperatures and high pressures. Further, the tendency for cracks to form along the bond lines between the scarf plug and tooling sections is reduced because both the scarf plug and tooling sections have the same coefficient of thermal expansion. In addition, the scarf plug can be machined and polished in the same manner as the tooling sections when the tooling surface requires reconditioning or modification.

Figure 4:
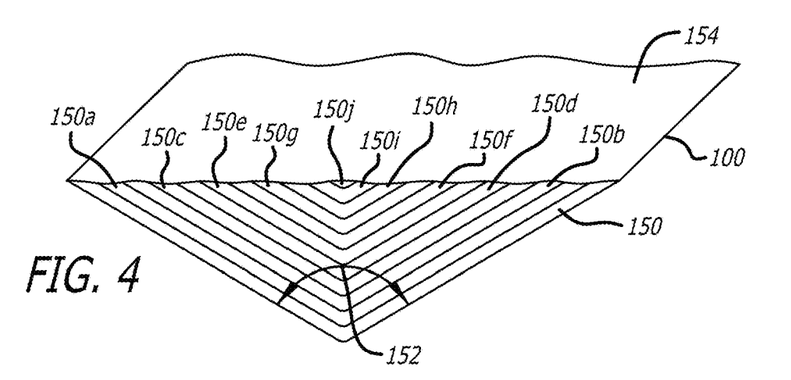
FIG. 4 is a partial view of a consolidated scarf plug before it is applied to the scarf seam.

A consolidated scarf plug that is used to over-fill seam 36 is shown at 100 in FIG. 4. The consolidated scarf plug 100 includes a first consolidated scarf plug layer 150 which corresponds to the first scarf plug layer 50 shown in FIG. 2. The consolidated scarf plug 100 also includes additional consolidated scarf plug layers 150a-150i, which correspond to additional scarf plug layers 50a-50i shown in FIG. 2. The consolidated scarf plug 100 is shown having an additional layer 150j.

The exterior side of the first consolidated scarf plug layer 150 is in the shape of a chevron having an interior angle 152. In order to fit into the seam formed by the first and second tool sections, which are chamfered at 20 to 45 degrees, the interior angle of the scarf chevron can range from 90 to 140 degrees. Preferably the interior angle of the chevron will be from 110 to 130 degrees in order to match tooling seam chamfers of 25-35 degrees. The preferred interior angle of the chevron is 120 degrees which corresponds to the preferred tooling seam chamfer of 30 degrees.

Figures 8, 9:
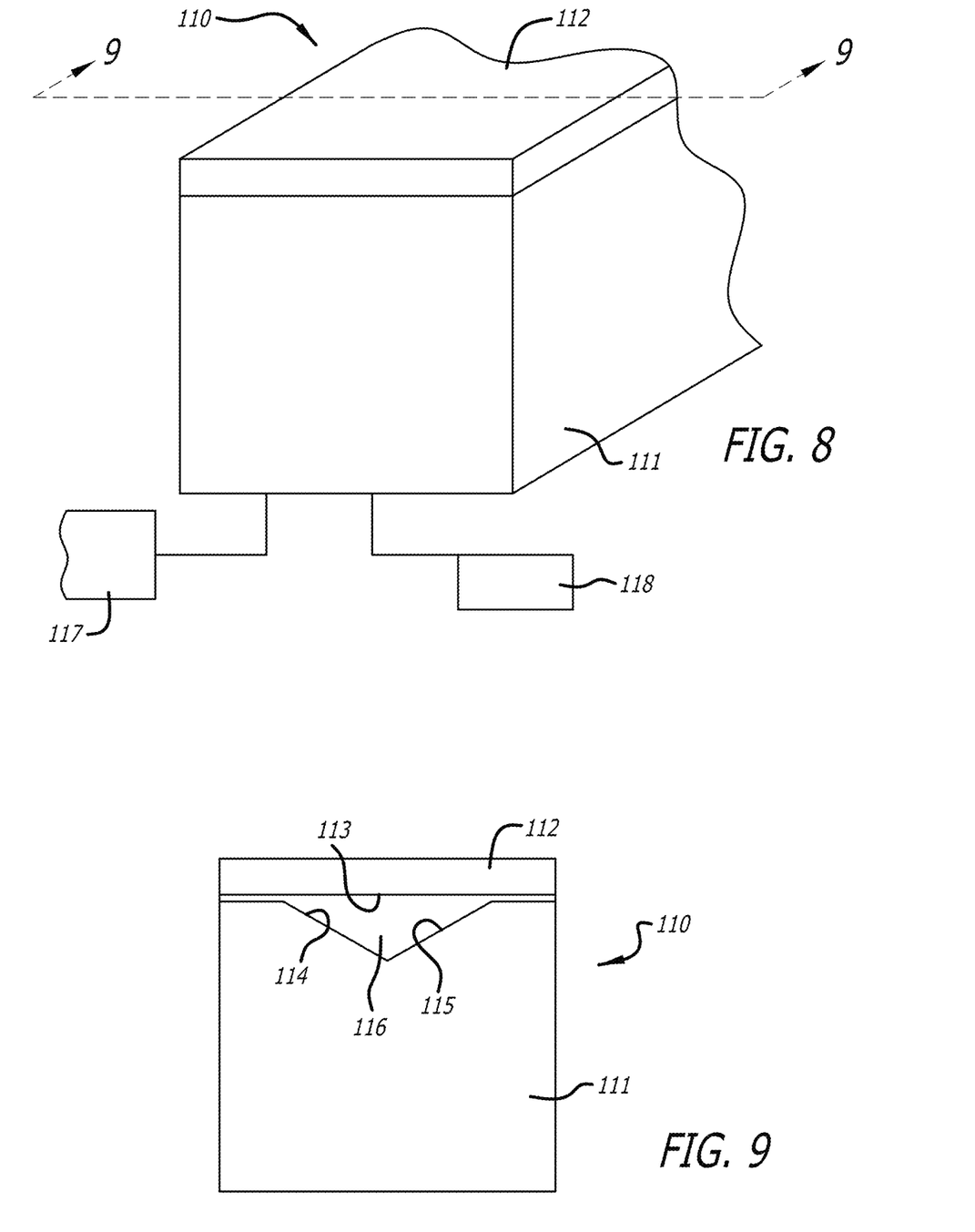
FIG. 8 shows a simplified compression mold apparatus that is used to make the consolidated scarf plug.
FIG. 9 is a cross-sectional view of the compression mold that is shown in FIG. 8.

The consolidated scarf plug 150 is made by placing suitably sized layers of quasi-isotropic sheet molding compound in a consolidation mold, such as the simplified compression mold shown at 110 in FIGS. 8 and 9. The mold 110 includes a mold body 111 and a removable top plate 112. The bottom 113 of the top plate 112 and the inside surfaces 114 and 115 of the consolidation mold 111 are shaped to provide a chevron-shaped mold cavity 116 that closely matches the desired scarf plug shape which in turn closely matches the shape of the seam being filled. The mold is sized so that the top 154 of the consolidated scarf plug over fills the seam, as described previously. The number of layers of quasi-isotropic sheet molding compound that are used for a particular scarf plug will typically vary from 5 to 30 depending upon the thickness of the layers and the size of the scarf plug.

Once the layers of uncured quasi-isotropic sheet molding compound are located in the consolidation mold cavity 116, the top plate 112 is secured in place. The mold 110 is then pressurized by a force application system, shown schematically at 117, and heated by a heating system, shown schematically at 118, to consolidate the layers into a solid uncured laminate which forms the consolidated scarf plug. The amount of heat and pressure that is applied to the layers of quasi-isotropic sheet molding compound is sufficient to consolidate the layers into a solid laminate without advancing the cure of the molding compound resin. It is desirable that curing of the molding compound resin does not occur until the consolidated scarf plug is located in the seam between the tooling sections. For a quasi-isotropic sheet molding compound composed of carbon fibers and a bismaleimide resin, the typical consolidation process will take from 5 minutes to 30 minutes at a temperature of 60 to 95° C. with an applied force on the mold of 30,000 to 50,000 pounds.

The consolidation mold 110 and the process for heating and pressurizing the mold cavity 116 are particularly well suited for forming quasi-isotropic sheet molding compound into uncured consolidated scarf plug preforms. However, the mold and consolidation process may also be used to form a wide variety of other consolidated preform shapes from quasi-isotropic sheet molding compound. The interior surfaces of the mold and top plate can be modified and shaped as desired to form a wide variety of cavity shapes. The resulting mold can then be used to form consolidated preforms which are curable to form a wide variety complex parts and structures including parts and structures used in aircraft and other aerospace vehicles.

Once formed, the consolidated scarf plug 150 may be used immediately or it can be stored under conditions that prevent curing of the uncured resin present in the consolidated scarf plug. An advantage provided by the consolidated scarf plug is that it can be manufactured and stored at one location and then shipped to another location where the multi-sectional tooling is being assembled. In addition, sets of different sized consolidated scarf plugs can be manufactured and stored in order to provide a ready supply of scarf plugs for sealing a variety of seams in multi-sectional tooling located at various locations.

The consolidated scarf plug 150 may be made from any of the quasi-isotropic sheet molding compounds that have been used to make composite tooling. Sheet molding compound made from chips composed of unidirectional carbon tows and a bismaleimide resin are preferred. A preferred exemplary quasi-isotropic sheet molding compound is Hex-Tool® M61. HexTool® M61 is available in areal weights of 2000 gsm and 4000 gsm. The nominal chip size is 8 mm wide and 50 mm long. Each chip contains carbon fibers and 38 percent by weight bismaleimide resin. The thickness of a cured layer of HexTool® M61 is 1.27 mm for the 2000 gsm sheet molding compound and 2.54 mm for the 4000 gsm material. The Tg of post cured HexTool® M61 is 275° C. with the maximum use temperature being 218° C. The coefficient of linear thermal expansion of cured HexTool® M61 is $4.0 \times 10^{-6}$/° C. (in Plane ASTME 289-95).

The consolidated scarf plug and tooling sections may be made from the same quasi-isotropic sheet molding compound or they can be made from different quasi-isotropic sheet molding compound. For example, 4000 gsm Hex-Tool® M61 is commonly used to make composite tooling. The scarf plug can also be made from 4000 gsm HexTool® M61 to match the tooling sections. In this case, from 8 to 12 layers of sheet molding compound are used to make a scarf plug that has a top surface that is approximately 5 cm wide.

Alternatively, 2000 gsm HexTool® M61 may be used to make scarf plugs for seaming together tooling sections made from 4000 gsm HexTool® M61. The lower areal weight sheet molding compound is useful where higher flexibility for the consolidated scarf plug is desired. 2000 gsm Hex-Tool® M61 is a preferred sheet molding compound because the resulting scarf plugs tend to have reduced amounts of wrinkles or folds. When 2000 gsm HexTool® M61 is used to make scarf plugs, the number of layers of sheet molding compound needed for a scarf plug having top surface that is 5 cm wide will range from 16 to 24 layers.

Figure 5:
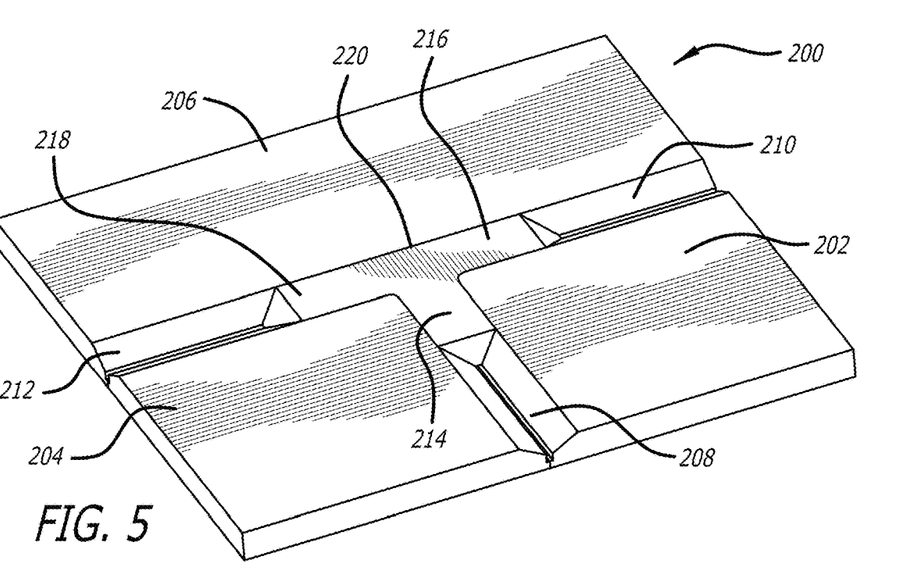
FIG. 5 is a partial view of an exemplary three piece multi-sectional composite tooling in accordance with the present invention.

A portion of an exemplary multi-sectional composite tooling is shown at 200 in FIG. 5. The multi-sectional tooling 200 includes a first tooling section 202, a second tooling section 204 and a third tooling section 206. A first seam 208 is located between the first and second tooling sections 202 and 204. A second seam 210 is located between the first and third tooling sections 202 and 206. A third seam 212 is located between the second and third tooling sections 204 and 206. The three seams 208, 210 and 212 are shown partially filled with scarf plugs 214, 216 and 218 in accordance with the present invention. The three seams meet at a T-junction 220. The scarf plugs 216 and 218 may be a single scarf plug. The scarf plugs may be overlapped or butt-jointed at junction 220. In addition, the T-junction can be formed as a single T-shaped consolidated scarf plug, if desired.

The three piece multi-sectional composite tooling is shown at 200 in FIG. 5 is an additional example of how multiple seams and a seam junction can be filled with scarf plugs in accordance with the present invention. As was the case with the exemplary two piece tooling 10, it will be recognized that the actual multi-sectional composite tooling will typically be made up of numerous tooling sections that are seamed together with numerous scarf plugs.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments and examples, but is only limited by the following claims.

What is claimed is:

1. A method for seaming a multi-sectional tooling that is used in molding a composite structure that has a molded surface, said method comprising the steps of:

providing a first tooling section comprising a first tooling surface which is shaped to form a first portion of the molded surface of said composite structure, a first side surface and a first scarf surface extending at an angle from said first tooling surface to said first side surface, said first scarf surface having a first exterior edge located at said first tooling surface and a first interior edge located at said first side surface, said first tooling section comprising multiple layers of cured quasi-isotropic sheet molding compound, said layers of sheet molding compound each comprising a plurality of randomly oriented chips wherein said chips comprise unidirectionally oriented fibers and a cured resin;

providing a second tooling section comprising a second tooling surface which is shaped to form a second portion of the molded surface of said composite structure, a second side surface and a second scarf surface extending at an angle from said second tooling surface to said second side surface, said second scarf surface having a second exterior edge located at said second tooling surface and a second interior edge located at said second side surface, said second tooling section comprising multiple layers of cured quasi-isotropic sheet molding compound, said layers of sheet molding compound each comprising a plurality of randomly oriented chips wherein said chips comprise unidirectionally oriented fibers and a cured resin;

locating said first tooling section and second tooling section adjacent to each other so that said first scarf surface and said second scarf surface form a scarf seam between said first and second tooling sections, said scarf seam having an apex extending along said first and second interior edges and an exterior boundary extending between said first and second exterior edges;

placing a layer of sealant layer between said first and second side surfaces, said sealant layer being located outside of said scarf seam; and overfilling said scarf seam with a consolidated uncured scarf plug which comprises a first consolidated scarf plug layer that is composed of a layer of consolidated quasi-isotropic sheet molding compound comprising a plurality of randomly oriented chips wherein said chips comprise unidirectionally oriented fibers and an uncured resin, said first consolidated scarf plug layer having an interior side and an exterior side wherein the interior side of said first consolidated scarf plug layer is located adjacent to the first and second scarf surfaces and extends from the first exterior edge to the apex and from the apex to the second exterior edge and wherein said exterior side of said first consolidated scarf plug layer has a surface contour extending from said first exterior edge to said second exterior edge that is in the shape of a chevron having an interior angle that is the same as the angle between the first scarf surface and the second scarf surface at the apex of said scarf seam, said consolidated scarf plug comprising a plurality of additional consolidated scarf plug layers located on the exterior side of said first consolidated scarf plug layer, each of said additional consolidated scarf plug layers comprising a consolidated quasi-isotropic sheet molding compound comprising a plurality of randomly oriented chips wherein said chips comprise unidirectionally oriented fibers and an uncured resin and wherein each of said additional consolidated scarf plug layers has an interior side and an exterior side, said additional consolidated scarf plug layers being located in said consolidated scarf plug such that the interior side of each additional consolidated scarf plug layer is located next to the exterior side of an adjacent additional consolidated scarf plug layer that is closer to said first consolidated scarf plug layer and wherein the interior side of one of said additional consolidated scarf plug layers is located adjacent to the exterior side of said first consolidated scarf plug layer and follows the surface contour of said consolidated first scarf plug layer, wherein one or more of said additional consolidated scarf plug layers extend past the exterior boundary of the scarf seam in order to overfill said scarf seam;

curing said consolidated uncured scarf plug that has overfilled said scarf seam to form a cured oversized scarf plug which includes a portion that extends past the exterior boundary of the scarf seam; and removing the portion of said cured oversized scarf plug that extends past the exterior boundary of the scarf seam to thereby form a tooling seam surface that extends between said first tooling surface and said second tooling surface.

2. The method for seaming a multi-sectional tooling according to claim 1 wherein the angle between the first scarf surface and said exterior boundary is between 25 degrees and 35 degrees and wherein the angle between the second scarf surface and said exterior boundary is between 25 degrees and 35 degrees.

3. The method for seaming a multi-sectional tooling according to claim 2 wherein the angle between the first scarf surface and said exterior boundary is 30 degrees and wherein the angle between the second scarf surface and said exterior boundary is 30 degrees.

4. The method for seaming a multi-sectional tooling according to claim 1 which includes the additional steps of locating a first layer of scarf plug adhesive between said first scarf surface and the interior side of said first scarf plug layer and locating a second layer of scarf plug adhesive between said second scarf surface and the interior side of said first scarf plug layer.

5. The method for seaming a multi-sectional tooling according to claim 1 wherein the first tooling section, second tooling section and scarf plug are made from layers of sheet molding compound having the same areal weight.

6. The method for seaming a multi-sectional tooling according to claim 1 wherein the areal weight of the layers of sheet molding compound used to make the first tooling section and second tooling section have an areal weight that is greater than the areal weight of the layers of consolidated quasi-isotropic sheet molding compound used to make said consolidated uncured scarf plug.

7. The method for seaming a multi-sectional tooling according to claim 1 wherein the first tooling section and second tooling section each comprises chips comprising carbon fibers and cured bismaleimide resin and said consolidated uncured scarf plug comprises carbon fibers and uncured bismaleimide resin.

8. The method for seaming a multi-sectional tooling according to claim 1 wherein the exterior boundary of said scarf seam extending between said first and second exterior edges is from 2 cm to 10 cm wide.

9. The method for seaming a multi-sectional tooling according to claim 1 wherein said tooling seam surface has surface tolerance of ±0.2 mm.

10. The method for seaming a multi-sectional tooling according to claim 1 wherein said tooling seam surface has a surface tolerance of ±0.1 mm.

* * * * *